US012794402B2

(12) United States Patent
Seeley et al.

(10) Patent No.: US 12,794,402 B2
(45) Date of Patent: Nov. 10, 2026

(54) MODULAR AND ROTATIONAL SOLAR POWER SOURCE SYSTEMS, APPARATUSES AND METHODS

(71) Applicants: Bruce E. Seeley, Cambridge (CA); Uwe Dirk Schaible, Ancaster (CA)

(72) Inventors: Bruce E. Seeley, Cambridge (CA); Stephen Craig Hanes, Delhi (CA); Uwe Dirk Schaible, Ancaster (CA)

( * ) Notice: Subject to any disclaimer, the term of this patent is extended or adjusted under 35 U.S.C. 154(b) by 0 days.

(21) Appl. No.: 18/625,850

(22) Filed: Apr. 3, 2024

(65) Prior Publication Data

US 2024/0339958 A1 Oct. 10, 2024

Related U.S. Application Data

(60) Provisional application No. 63/457,070, filed on Apr. 4, 2023.

(51) Int. Cl.
*H02S 20/32* (2014.01)

(52) U.S. Cl.
CPC .................................... *H02S 20/32* (2014.12)

(58) Field of Classification Search
CPC ..................... H02S 20/00–32; H02S 40/30–44
USPC .................................................. 136/243–265
See application file for complete search history.

(56) References Cited

U.S. PATENT DOCUMENTS

| | | | |
|---|---|---|---|
| 8,029,154 | B2 | 10/2011 | Myer |
| 8,588,830 | B2 | 11/2013 | Myer et al. |
| 8,714,768 | B2 | 5/2014 | Tittle |
| 9,577,572 | B2 | 2/2017 | Giles |
| 10,135,389 | B2 | 11/2018 | Braghiroli |
| 10,451,233 | B1 | 10/2019 | Izradel |
| D984,709 | S | 4/2023 | Adams |

(Continued)

FOREIGN PATENT DOCUMENTS

| | | | |
|---|---|---|---|
| AU | 2022100034 | A4 | 3/2022 |
| CA | 2802682 | A1 | 12/2011 |

(Continued)

OTHER PUBLICATIONS

CN-214948712-U English (Year: 2021).*
TW-M551787-U English (Year: 2017).*

*Primary Examiner* — Bach T Dinh
(74) *Attorney, Agent, or Firm* — Own Innovation; James W. Hinton; Osman Ismaili

(57) ABSTRACT

A system and apparatus are provided herein. The system includes a base post to receive a module and a top-mounted equipment. The modules include a curved radially segmented surface for attachment of a solar panel thereon; an internal cavity within the module; and connectors to facilitate mechanical, electrical, and thermal interconnection between the module and an additional component. The internal cavity is to engage with the base post; accommodate and secure a controller and a battery, the controller and the battery in electrical communication with each other and the solar panel, the controller to charge the battery with electricity generated by the solar panel; accommodate a rotation mechanism to rotate the module to track sunlight, the module independently rotatable about the base post. The top-mounted equipment is to be coupled to the module and in electrical communication with the module, the top-mounted equipment is independently rotatable about the module.

22 Claims, 12 Drawing Sheets

(56) References Cited

U.S. PATENT DOCUMENTS

| | | | |
|---|---|---|---|
| D995,866 S | 8/2023 | Kovacic et al. | |
| 11,859,793 B2 | 1/2024 | Huang et al. | |
| 2007/0199589 A1 | 8/2007 | Corbero Fornt | |
| 2013/0038124 A1* | 2/2013 | Newdoll ........... | H02J 13/00028 307/31 |
| 2013/0335956 A1 | 12/2013 | Scott et al. | |
| 2014/0362564 A1 | 12/2014 | Giblett | |
| 2015/0021990 A1 | 1/2015 | Myer et al. | |
| 2017/0279187 A1 | 9/2017 | Lockwood et al. | |
| 2018/0172229 A1 | 6/2018 | Lockwood et al. | |
| 2022/0263457 A1 | 8/2022 | Akhavan-Tafti | |
| 2022/0352843 A1 | 11/2022 | Hornbachner et al. | |

FOREIGN PATENT DOCUMENTS

| | | | |
|---|---|---|---|
| CA | 3033523 C | | 6/2021 |
| CA | 3209619 A1 | | 9/2022 |
| CA | 2955629 C | | 3/2023 |
| CN | 203082776 U | | 7/2013 |
| CN | 103383972 A | | 11/2013 |
| CN | 204420855 U | | 6/2015 |
| CN | 107631248 A | | 1/2018 |
| CN | 206973440 U | | 2/2018 |
| CN | 207490808 U | * | 6/2018 |
| CN | 104864351 B | | 10/2018 |
| CN | 107217903 B | | 2/2019 |
| CN | 208475194 U | | 2/2019 |
| CN | 109488966 A | | 3/2019 |
| CN | 208595498 U | | 3/2019 |
| CN | 208901291 U | | 5/2019 |
| CN | 208919961 U | | 5/2019 |
| CN | 111396814 A | | 7/2020 |
| CN | 211399615 U | | 9/2020 |
| CN | 211625171 U | | 10/2020 |
| CN | 211853821 U | | 11/2020 |
| CN | 211925621 U | | 11/2020 |
| CN | 211976749 U | | 11/2020 |
| CN | 213178140 U | | 5/2021 |
| CN | 214038188 U | | 8/2021 |
| CN | 214580817 U | | 11/2021 |
| CN | 214948712 U | * | 11/2021 |
| CN | 214948719 U | | 11/2021 |
| CN | 111147004 B | | 12/2021 |
| CN | 216383935 U | | 4/2022 |
| CN | 217382750 U | | 9/2022 |
| CN | 115307092 A | | 11/2022 |
| CN | 217875628 U | | 11/2022 |
| CN | 217875629 U | | 11/2022 |
| CN | 112197226 B | | 12/2022 |
| CN | 219797070 U | | 10/2023 |
| EP | 2273557 A3 | | 11/2011 |
| EP | 2796774 A1 | | 10/2014 |
| EP | 3353542 A1 | | 8/2018 |
| GB | 2408395 A | | 5/2005 |
| GB | 2591122 B | | 7/2022 |
| IT | 202100004979 A1 | | 9/2022 |
| JP | 2009176578 A | | 8/2009 |
| KR | 20100116899 A | | 11/2010 |
| KR | 101001341 B1 | | 12/2010 |
| KR | 101096564 B1 | | 12/2011 |
| KR | 200457489 Y1 | | 12/2011 |
| KR | 101150362 B1 | | 6/2012 |
| KR | 101213665 B1 | | 12/2012 |
| KR | 101308794 B1 | | 9/2013 |
| KR | 20130102908 A | | 9/2013 |
| KR | 20130107734 A | | 10/2013 |
| KR | 101362447 B1 | | 2/2014 |
| KR | 101414258 B1 | | 7/2014 |
| KR | 101458527 B1 | | 11/2014 |
| KR | 101472907 B1 | | 12/2014 |
| KR | 101476709 B1 | | 12/2014 |
| KR | 101788672 B1 | | 10/2017 |
| KR | 102110935 B1 | | 5/2020 |
| KR | 20210155288 A | | 12/2021 |
| KR | 102441270 B1 | | 9/2022 |
| KR | 102530989 B1 | | 5/2023 |
| KR | 20230121278 A | | 8/2023 |
| KR | 102607091 B1 | | 11/2023 |
| KR | 102615953 B1 | | 12/2023 |
| KR | 102633988 B1 | | 2/2024 |
| KR | 102633992 B1 | | 2/2024 |
| RU | 216726 U1 | | 2/2023 |
| TW | M551787 U | * | 11/2017 |
| WO | 2011013063 A3 | | 6/2011 |
| WO | 2011155657 A1 | | 12/2011 |
| WO | 2012111870 A1 | | 8/2012 |
| WO | 2012111871 A1 | | 8/2012 |
| WO | 2021089553 A1 | | 5/2021 |
| WO | 2023019362 A1 | | 2/2023 |

* cited by examiner

MODULAR AND ROTATIONAL SOLAR POWER SOURCE SYSTEMS, APPARATUSES AND METHODS

TECHNICAL FIELD

The embodiments disclosed herein relate to solar power sources, and, in particular to a modular and rotational solar power source structure consisting of an array of solar panels strategically mounted and configured for enhanced seasonal and geographic light energy capture for the creation of electricity.

INTRODUCTION

A problem exists in the solar power source industry wherein most solar configurations are either fixed in one direction (i.e., South in the Northern Hemisphere), and/or require complex sun tracking hardware/software components to efficiently harvest the sun's rays. For example, without East-West tracking, a South facing solar panel will not be able to efficiently capture sunlight available in the morning or late afternoon. Seasonal fluctuation in weather patterns may cause extended periods where the day begins clear and then clouds over by noon with clouds persisting into the late evening. Studies of weather patterns have indicated that such daily weather patterns are related to surface heat release and can be systematically enhanced in large metropolitan areas. Similar effects can be found during the Fall and early Winter in Northern climates where cooling temperatures interact with the latent heat from the terrain, resulting in clear skies overnight followed by cloud formation during the day.

Accordingly, there is a need for an improved system, apparatus and method for solar power harvesting that overcomes at least some of the disadvantages of existing systems, apparatuses, and methods.

This introduction information is provided to reveal information believed by the applicant to be of possible relevance to the present disclosure. No admission is necessarily intended, nor should be construed, that any of the preceding information constitutes prior art against the present disclosure.

SUMMARY

A solar power system is provided. The system includes a base post configured to receive a module and a top-mounted equipment. The module includes a curved radially segmented surface for attachment of a solar panel thereon. The module further includes an internal cavity within the module. The internal cavity is configured to engage with the base post. The internal cavity is further configured to accommodate and secure a controller and a battery, the controller and the battery in electrical communication with each other and the solar panel. The controller is configured to charge the battery with electricity generated by the solar panel. The internal cavity is further configured to accommodate a rotation mechanism configured to rotate the module to track sunlight. The module is independently rotatable about the base post. The module further includes connectors configured to facilitate mechanical, electrical, and thermal interconnection between the module and an additional component. The top-mounted equipment is configured to be coupled to the module and in electrical communication with the module. The top-mounted equipment is independently rotatable about the module.

In an embodiment, the additional component includes a second module.

In an embodiment, the controller of the module is configured to be in electrical communication with a solar panel of the second module.

In an embodiment, the module is configured to electrically connect to the additional component in at least one of series, and parallel.

In an embodiment, the module further includes a thermal management system for regulating temperature within the module.

In an embodiment, the solar panel includes a set of photovoltaic (PV) cells.

In an embodiment, each PV cell of the set of PV cells is controlled separately by the controller.

In an embodiment, the module is configured to electrically connect to a power grid via at least one of: the base post, and the top-mounted equipment.

In an embodiment, the module is configured to operate electrically and thermally independently of the base post, the additional component, and the top-mounted equipment.

In an embodiment, the module is configured to obtain electrical or thermal energy available to the base post, the additional component, or the top-mounted equipment.

In an embodiment, the rotation mechanism includes a cavity to rotatably engage with at least a portion of the base post.

An apparatus for solar power harvesting is provided. The apparatus includes a module having a curved radially segmented surface for attachment of a solar panel thereon. The apparatus further includes an internal cavity within the module. The internal cavity is configured to engage with a base post. The internal cavity is further configured to accommodate and secure a controller and a battery, the controller and the battery in electrical communication with each other and the solar panel. The controller is configured to charge the battery with electricity generated by the solar panel. The internal cavity is further configured to accommodate a rotation mechanism configured to rotate the module to track sunlight. The module is independently rotatable about the base post. The module further includes connectors configured to facilitate mechanical, electrical, and thermal interconnection between the module and an additional component.

In an embodiment, the additional component includes a second module.

In an embodiment, the controller of the module is configured to be in electrical communication with a solar panel of the second module.

In an embodiment, the module is configured to electrically connect to the additional component in at least one of series, and parallel.

In an embodiment, the module further includes a thermal management system for regulating temperature within the module.

In an embodiment, the solar panel includes a set of photovoltaic (PV) cells.

In an embodiment, each PV cell of the set of PV cells is controlled separately by the controller.

In an embodiment, the module is configured to electrically connect to a power grid via at least one of: the base post, and the top-mounted equipment.

In an embodiment, the module is configured to operate electrically and thermally independently of the base post, the additional component, and the top-mounted equipment.

In an embodiment, the module is configured to obtain electrical or thermal energy available to the base post, the additional component, or the top-mounted equipment.

In an embodiment, the rotation mechanism includes a cavity to rotatably engage with at least a portion of the base post.

Other aspects and features will become apparent, to those ordinarily skilled in the art, upon review of the following description of some exemplary embodiments.

BRIEF DESCRIPTION OF THE DRAWINGS

The drawings included herewith are for illustrating various examples of articles, methods, and apparatuses of the present specification. In the drawings.

DETAILED DESCRIPTION

Figure 1:
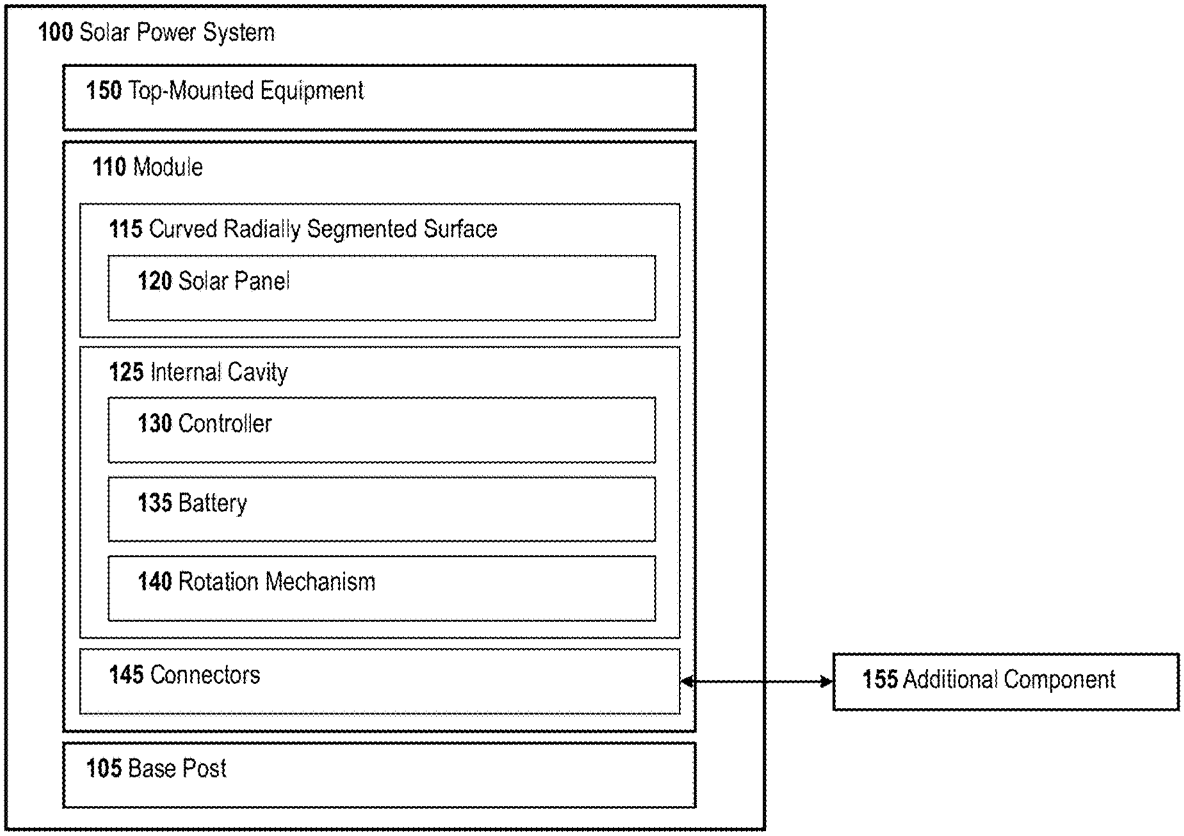
FIG. 1 is a block diagram of an example solar power system, according to an embodiment.

Various apparatuses or processes will be described below to provide an example of each claimed embodiment. No embodiment described below limits any claimed embodiment and any claimed embodiment may cover processes or apparatuses that differ from those described below. The claimed embodiments are not limited to apparatuses or processes having all of the features of any one apparatus or process described below or to features common to multiple or all of the apparatuses described below.

As used herein, the term "about" should be read as including variation from the nominal value, for example, a +/−10% variation from the nominal value. It is to be understood that such a variation is always included in a given value provided herein, whether or not it is specifically referred to.

One or more systems described herein may be implemented in computer programs executing on programmable computers, each comprising at least one processor, a data storage system (including volatile and non-volatile memory and/or storage elements), at least one input device, and at least one output device. For example, and without limitation, the programmable computer may be a programmable logic unit, a mainframe computer, server, and personal computer, cloud-based program or system, laptop, personal data assistance, cellular telephone, smartphone, or tablet device.

Each program is preferably implemented in a high-level procedural or object-oriented programming and/or scripting language to communicate with a computer system. However, the programs can be implemented in assembly or machine language, if desired. In any case, the language may be a compiled or interpreted language. Each such computer program is preferably stored on a storage media or a device readable by a general or special purpose programmable computer for configuring and operating the computer when the storage media or device is read by the computer to perform the procedures described herein.

A description of an embodiment with several components in communication with each other does not imply that all such components are required. On the contrary, a variety of optional components are described to illustrate the wide variety of possible embodiments of the present invention.

Further, although process steps, method steps, algorithms or the like may be described (in the disclosure and/or in the claims) in a sequential order, such processes, methods and algorithms may be configured to work in alternate orders. In other words, any sequence or order of steps that may be described does not necessarily indicate a requirement that the steps be performed in that order. The steps of processes described herein may be performed in any order that is practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

The following relates generally to solar power sources, and more particularly to a modular and rotational solar power source structure consisting of an array of solar panels strategically mounted and configured for enhanced seasonal and geographic light energy capture for the creation of electricity.

In an embodiment of the present disclosure, this general configuration of solar panels mimics the tracking of the sun from East to South to West in various longitudinal locations around the Earth, depending on how the power source structure is configured both physically and electrically, with solar panels.

In various embodiments, each solar element, consisting of one or more connected solar panels, is independently controlled using an electronic controller to optimize its solar energy capture and transfer that captured energy to the electricity storage system. At any point in time, each element on the modular and rotational solar power structure contributes a portion of the total captured energy, with that portion being generated using that solar element's optimal voltage and current to produce the highest power capable under that element's illumination conditions.

As the sun transverses East to South to West, different solar elements on the solar power structure become peak energy contributors without affecting the other independently generating elements. Such a configuration thereby allows for the enhanced generation of electricity using solar energy during the morning and late afternoon periods when the solar elevation is low, or when the celestial azimuth is significantly away from the North or South point of the horizon.

Advantageously, the technology disclosed herein solves the problem of most solar configurations being either fixed in one direction, or requiring complex sun tracking hardware/software components. This is achieved by the power source structure of the present disclosure that is generally (or substantially) vertical and which can adopt solar panels in an array configuration wired in various configurations such as, but not limited to series and/or parallel.

Examples of use cases of the technology disclosed herein include but are not limited to solar powered LED parking lot lighting, security cameras, Wi-Fi™ antennae, power backups, charging stations, and the like, all exhibit the following key advantages.

The solar solution of the present disclosure reduces the complexity of installing traditional, grid powered, systems. Items such as wire trenching, purchase and installation of conduit and cable, cost of electricity, local municipal requirements such as permitting, and the environmental impact. The solar powered device shown and described herein also has the advantage of being able to be installed in remote areas that are exposed to sun rays and is suitable for low light energy production even when the solar elevation is low or the celestial azimuth is significantly away from the North or South point of the horizon.

Such benefits and advantages of the present technology are also amplified in geographic regions with higher latitude, due to the lower arc of the sun.

In an embodiment of the present disclosure, a power source structure system and apparatus is provided that is generally (or substantially) vertical and which can adopt solar panels in an array configuration wired in various configurations such as, but not limited to series and/or parallel.

In one embodiment, this general configuration of solar panels mimics the tracking of the sun from East to South to West in various longitudinal locations around the Earth, depending on how the power source structure is configured both physically and electrically, with solar panels.

In this embodiment, each solar element, consisting of one or more connected solar panels, is independently controlled using an electronic controller to optimize its solar energy capture and transfer that captured energy to the electricity storage system.

At any point in time, each element on the modular and rotational solar power structure contributes a portion of the total captured energy, with that portion being generated using that solar element's optimal voltage and current to produce the highest power capable under that element's illumination conditions.

As the sun transverses East to South to West, different solar elements on the solar power structure become peak energy contributors without affecting the other independently generating elements. Such a configuration thereby allows for the enhanced generation of electricity using solar energy during the morning and late afternoon periods when the solar elevation is low, or when the celestial azimuth is significantly away from the North or South point of the horizon.

FIG. 1 depicts a block diagram of an example solar power system 100, according to an embodiment of the present disclosure. The system 100 includes a base post 105 configured to receive a module 110 and a top-mounted equipment 150.

In various embodiments, the system 100 may include a number of modules 110 depending on factors including geographical location, energy and device requirements, or height requirements.

Each module 110 of a plurality of modules 110 may thus be configured to receive, store, and/or supply energy independently of the other modules 110.

In various embodiments, top-mounted equipment 150 may be used for any number of purposes or devices. For example, top-mounted equipment 150 may include, without limitation, a lamp head, an LED light, a wind turbine, a security camera, a beacon, a radio frequency (RF) device, a Wi-Fi™ antenna, a weather station device, a sensor array, a camera, or any combination of devices.

The base post 105 may be a vertically configured, length variable, base structure that is designed and manufactured to be affixed to a concrete base or extended for direct bury. The base post 105 is designed in a manner to allow the later modular solar and battery structure, module 110, to be installed/affixed to the base post 105 with ease.

The length of the base post 105 may vary and may be manufactured to suit specific requirements.

In some embodiments, a concrete base or other suitable rigid structure may be installed into the ground to act as the base for the base post 105, and later installed power source structure, consisting of design elements tailored to local municipality requirements and designed/approved by an Engineer. Often this structure will include concrete, grounding materials (PVC or ABS Pipe/grounding rod/grounding plate), fiberglass or rebar reinforcements, and mounting elements, including but not limited to J-Bolts.

Figures 12A, 12B, 12C:
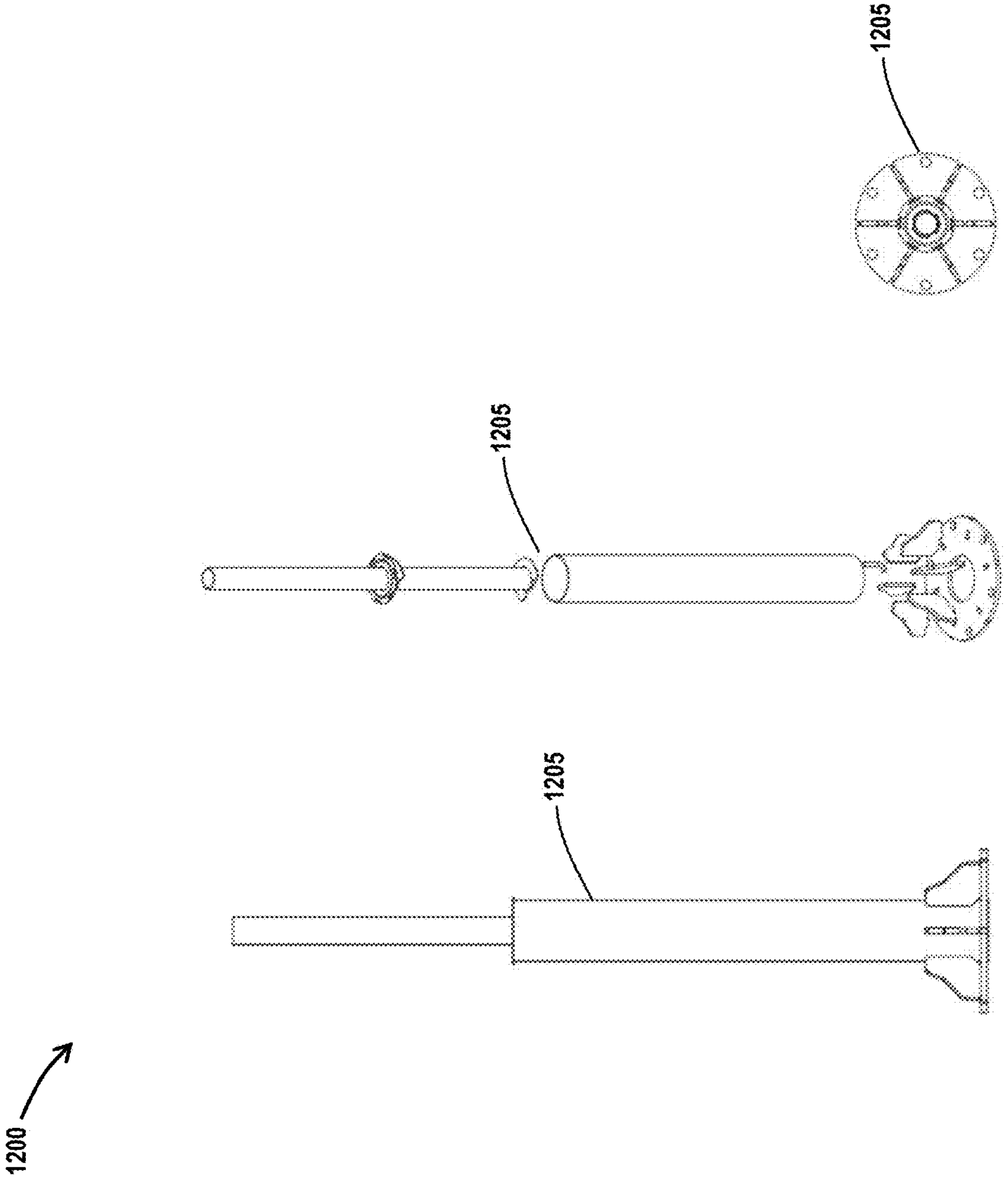
FIGS. 12A, 12B and 12C are front, exploded and top views of an example base post, according to an embodiment.

FIGS. 12A, 12B and 12C depict front, exploded and top views of an example base post, according to an embodiment of the present disclosure.

The module 110 includes a curved radially segmented surface 115 for attachment of a solar panel 120 thereon. The module 110 further includes an internal cavity 125 within the module 110.

The curvature of the solar panel 120 mounting surface (curved radially segmented surface 115) allows the sun's energy to be captured as it rises and sets from dawn to dusk. The design element allows an East to South to West energy capture depending on how the solar panel 120 array is installed on the curved radially segmented surface 115 of the modular assembly.

Solar panels 120 may be mounted to the module 110 in such a way that each solar panel 120 covers a sector of potential illumination to be configured in part or as a whole element that is to be uniquely controlled in terminal voltage and current.

In some embodiments, solar panels 120 may be of a flexible type. In other embodiments, the solar panels 120 may be of a rigid type.

In some embodiments, solar panels 120 may be wired in different configurations such as series and/or parallel to optimize the capture of the sun's rays for the power requirements.

This universal modular body construction advantageously allows the module 110 to have solar panels arranged radially in segmented columns. Each individual column may then be controlled independently to generate maximum power as the sun transverses its natural arc from East to West.

Solar panel 120 elements may be mounted along the curved radially segmented surface 115 in sectors. Each vertical sector of solar panel 120 elements mounted to the curved radially segmented surface 115 may be electrically connected to form a plurality of modules ultimately creating a fixed light tracking configuration as sun tracks East to South to West.

Modules 110 may be scalable to provide a solar panel area for directional solar capture using one or a plurality of solar panel column segments.

A module 110 may be constructed from any suitable material, including without limitation, steel, aluminum, plastic/polymer, or other composite material.

Each solar panel 120 column element may be connected in series or in parallel with adjacent modules 110 to provide an appropriately matched photovoltaic (PV) voltage for the one or more of Maximum Power Point Tracking (MPPT) controllers connected to that or a plurality of solar panel 120 column elements.

In various embodiments, the configuration of the solar panels 120 may be such that a sector of a curved solar panel 120 mounting circuit may be grouped as a controllable element.

The number and type of solar panels 120 affixed to a module 110 may vary. For example, a vertical solar panel 120 may be adhered over the full length of two or four sections of a module 110, while a second, third, or fourth panel may be configured every 45 degrees around the curvature of the module 110. This type of configuration may also be known as an infinite array of solar panels.

The internal cavity 125 is configured to engage with the base post 105.

The internal cavity 125 is further configured to accommodate and secure a controller 130 and a battery 135. The controller 130 and the battery 135 are in electrical communication with each other and the solar panel 120. The controller 130 is configured to charge the battery 135 with electricity generated by the solar panel 120.

In some embodiments, the battery 135 and/or controller 130 may be within a compartment inside the internal cavity 125 having a hinged and keyed swinging door.

In various embodiments, the controller 130 may be a Maximum Power Point Tracking (MPPT) controller for stationary solar tracking in a module 110.

One or more MPPT controllers for each of the one or more solar panel column segments may be connected to one or more of the batteries 135 contained in one or more modules 110.

Moreover, a solar charge controller 130 may interface with either one or a plurality of solar panel 120 elements to provide independent and unique control of each element voltage and current. Thus, this may allow for the production of the highest power capable under that solar panel 120 element's illumination conditions while still being able to transfer energy to one or more batteries 135 (or battery management devices) regardless of fluctuations or mismatch in the battery terminal voltage.

In various embodiments, the solar charge controller 130 may be configured to operate independently, or via remote control, or through some combination thereof via integrated communications technology.

The battery 135 inside the module 110 may consist of any suitable chemistry and composition battery (either electrochemical or electromechanical) such as Absorbent Glass Mat (AGM) or Lithium Ferro Phosphate technology (LFP or LiFePO4) but is not limited to any specific technology and may accommodate other types of batteries as well.

Those of skill in the art will appreciate that battery management systems may also vary depending on a battery type.

In various embodiments, a battery management system may be either an integral part of the solar charge controller 130, or within the battery 135, or as a separate device within the module 110.

The internal cavity 125 is further configured to accommodate a rotation mechanism 140 configured to rotate the module 110 to track sunlight. The module 110 is independently rotatable about the base post 105.

In some embodiments, the rotation mechanism 140 includes a cavity to rotatably engage with at least a portion of a base post.

In various embodiments, the rotation mechanism 140 may include, without limitation, a motorized mechanism, or it may be non-motorized mechanism. For example, a pipe with a collar (e.g., a part of the base post 105) may be rotatably engaged with another pipe (e.g., rotation mechanism 140) to allow the module 110 to rotate.

The solar panels 120 are thus able to be pointed in the optimal direction to capture, at the highest efficiency, the sun's rays. Substantially vertical, the solar module 110 assembly may rotate/pivot about its z-axis to achieve this. Once configured, top-mounted equipment 150 may be independently configured and pointed in a different from the module 110 direction depending on the nature of the use.

In various embodiments, the internal cavity 125 within each module 110 has a configurable tray, shelf, and bracket design to support, without limitation, energy storage devices, control equipment and communication equipment.

Furthermore, each module 110 may have a removable or hinged backing 116 on a non-solar panel side to provide access to an energy storage, communications, and control compartment.

The internal cavity 125 may be lined or filled with insulative material to prevent heat loss and ingress to or from the internally housed equipment.

The module 110 further includes connectors 145 configured to facilitate mechanical, electrical, and thermal interconnection between the module 110 and an additional component 155.

In various embodiments, the connectors 145 are further configured to facilitate mechanical, electrical, and/or thermal interconnection between the module 110, the base post 105, and the top-mounted equipment 150.

The top-mounted equipment 150 is configured to be coupled to the module 110 and in electrical communication with the module 110. The top-mounted equipment 150 is independently rotatable about the module 110.

In various embodiments, depending on the length of the base post 105, the top-mounted equipment 150 may be coupled to the base post 105, and/or independently rotatable about the base post 105. Thus, in some embodiments, the top-mounted equipment 150 may be in mechanical, electrical, and thermal interconnection with the base post 105.

Each module 110 may thus be configured to provide a rotational z-axis relative to an adjacent module 110 or a top-mounted equipment 150.

In some embodiments, the additional component 155 includes a second module.

In various embodiments, a plurality of modules 110 may be attached to each other without the use of a separate interconnecting member.

As contemplated by the present disclosure, a module 110 may be electrically and thermally connected to another module to allow for interconnectivity between modules.

In some embodiments, the controller 130 of the module 110 is configured to be in electrical communication with a solar panel of the second module.

In some embodiments, the module 110 is configured to electrically connect to the additional component 155 in series. In some embodiments, the module 110 is configured to electrically connect to the additional component 155 in parallel.

In some embodiments, the module 110 further includes a thermal management system for regulating temperature within the module 110.

Thermal management within a module 110 may be achieved in a number of ways, including using insulation (e.g., spray foam) and techniques of heating the batteries in each module 110. As functionality and charging capabilities of certain battery types may be limited by cold temperatures, internal heater-equipped batteries or heaters within the module 110 may be utilized. In various embodiments, particularly those on a larger-scale, a mini-heat pump may also be used within a module.

Similarly, these concepts may be extended to cooling, such that a module 110 may employ various techniques for cooling, including fans or liquid coolants.

In various embodiments, one or more batteries 135 in the module 110 may be heated or cooled independently of the charge/discharge status of the battery 135 using energy supplied by the solar panels 120, or interconnected base post 105, or top-mounted equipment 150.

The heating algorithm for each battery 135 may be adjustable based on factors including, but not limited to, the measured module 110 temperature, the internal temperature of the battery 135, the time of day, the available energy via the solar panels 120, or interconnected base post 105, or top-mounted equipment 150, and state of charge of the battery 135.

The heating algorithm for each battery 135 may use energy sourced from its own internally stored energy, externally from its solar panels 120, or co-housed one or more batteries 135, or externally from one or more adjacent connected modules 110 solar panels 120 or co-housed one or more batteries 135, or externally from energy supplied via the interconnected base post 105, or top-mounted equipment 150.

In some embodiments, the solar panel 120 includes a set of photovoltaic (PV) cells. Such cells can be made using different technologies such as Monocrystalline silicon, Polycrystalline silicon, Thin-film, Concentrated PV (CPV), Organic Photovoltaic (OPV), Perovskite, or Dye Sensitized Solar Cells (DSSC).

Each PV cell may thus be easily replaceable if damaged or malfunctioning.

In some embodiments, each PV cell of the set of PV cells is controlled separately by the controller 130.

A controller 130 may be configured to control each PV cell of a plurality of PV cells independently of the others, in order to maximize efficiency.

In various embodiments, solar elements (i.e., PV cells) of a module 110 may be connected in series and/or in parallel, as well as to solar elements of another module 110.

In some embodiments, the module 110 is configured to electrically connect to a power grid via the base post 105. In some embodiments, the module 110 is configured to electrically connect to a power grid via the top-mounted equipment 150.

In some embodiments, the module 110 is configured to operate electrically and/or thermally independently of the base post 105, the additional component 155, and the top-mounted equipment 150.

Thus, each module 110 may source and/or store energy independently of the energy available from adjacent connected modules 110, base post 105, or interconnected top-mounted equipment 150.

In some embodiments, module 110 is configured to obtain electrical or thermal energy available to the base post 105, the additional component 155, or the top-mounted equipment 150.

Each module 110 may source energy available to adjacent connected modules 110, base post 105, or interconnected top-mounted equipment 150.

Thus, each module 110 may be able to operate both independently as its own energy source for heating and peripheral supply, and dependently on adjacent modules 110, base post 105, or interconnected top-mounted equipment 150 to receive energy for heating and peripheral supply.

In various embodiments, a first module 110 may be able to source energy from a second module 110, and provide that energy to a third module 110. Similarly, a module 110 may be able to source energy from, for example, a base post 105 that is connected to a power grid, or an interconnected top-mounted equipment 150 that is a wind turbine.

Modules 110 may be pre-assembled at a manufacturing facility in a fashion that when shipped on site can take minimal assembly prior to being hoisted onto the base post 105. When hoisted onto the base post 105, a module 110 may be configured/pointed to the optimal direction to best capture the sun's rays based on the solar array configuration and instructions provided by the manufacturer.

Figure 2:
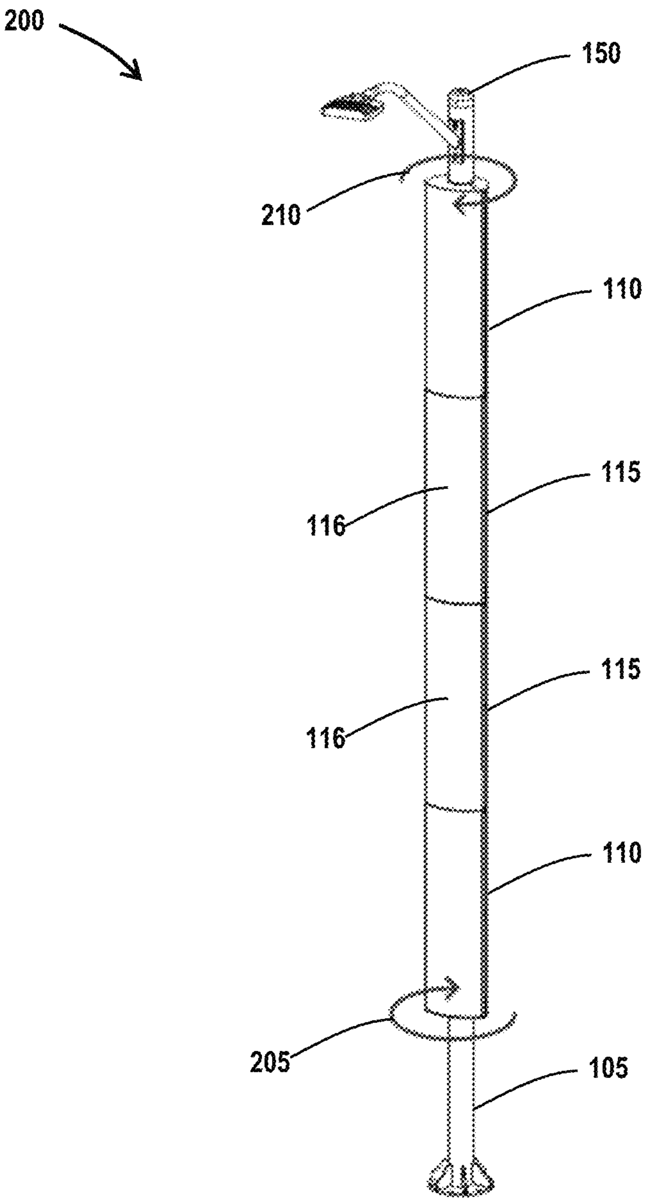
FIG. 2 is a perspective view of an example configuration based on the system of FIG. 1, according to an embodiment.

FIG. 2 depicts a perspective view of an example configuration 200 based on the system of FIG. 1, according to an embodiment of the present disclosure. The configuration 200 depicts the base post 105, various modules 110 and top-mounted equipment 150.

As an example, top-mounted equipment 150 is depicted as being a lamp head.

Similarly, a plurality of modules 110 are depicted in FIG. 2. It will be understood by those of skill in the art that number of modules 110 can vary depending on, without limitation, geographical location, energy and device requirements, or height requirements.

The configuration 200 further depicts the curved radially segmented surface 115 for attachment of a solar panel thereon.

The configuration 200 further depicts the removable or hinged backing 116 on a non-solar panel side of a module 110.

The configuration 200 further depicts arrow 205 indicating that modules 110 may be rotated independently of the base post 105. Similarly, arrow 210 indicates that top-mounted equipment 150 may be rotated independently of the modules 110.

Figure 3:
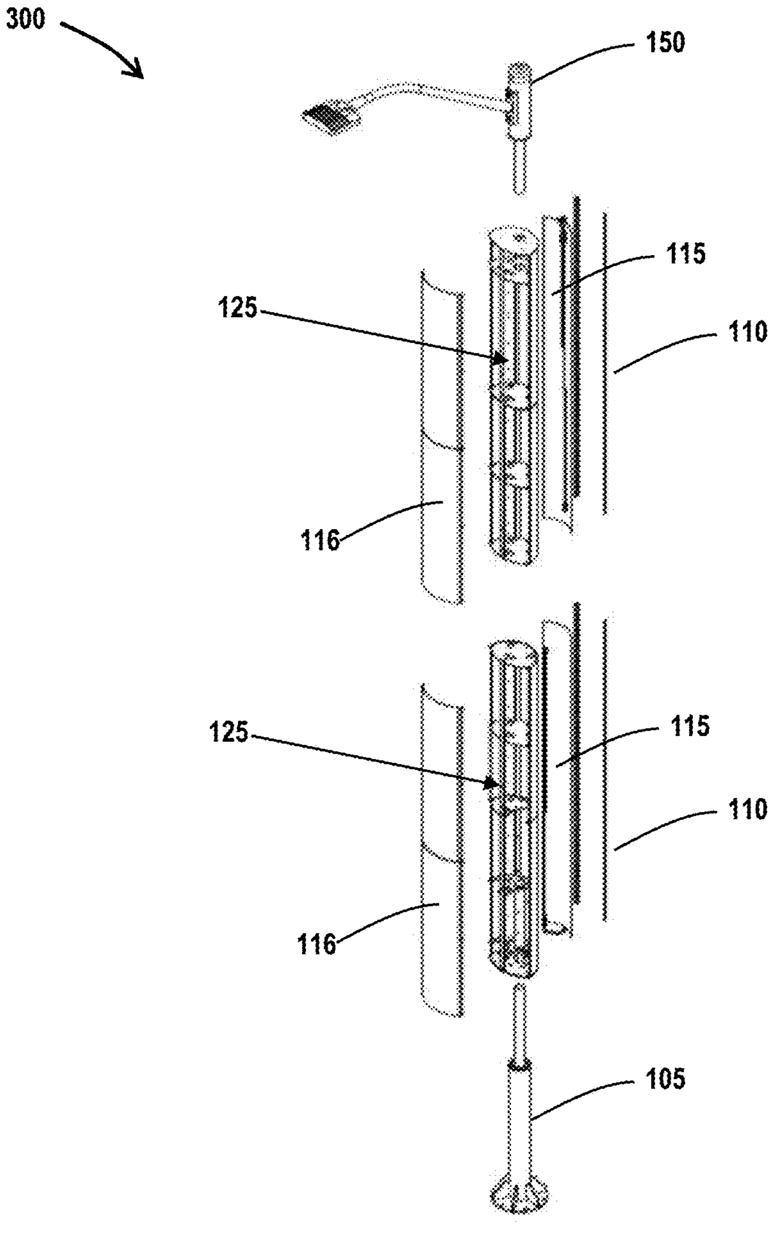
FIG. 3 is an exploded view of an example configuration based on the system of FIG. 1, according to an embodiment.

FIG. 3 depicts an exploded view of an example configuration 300 based on the system of FIG. 1, according to an embodiment of the present disclosure.

The exploded view configuration 300 additionally depicts the internal cavity 125.

Figure 4:
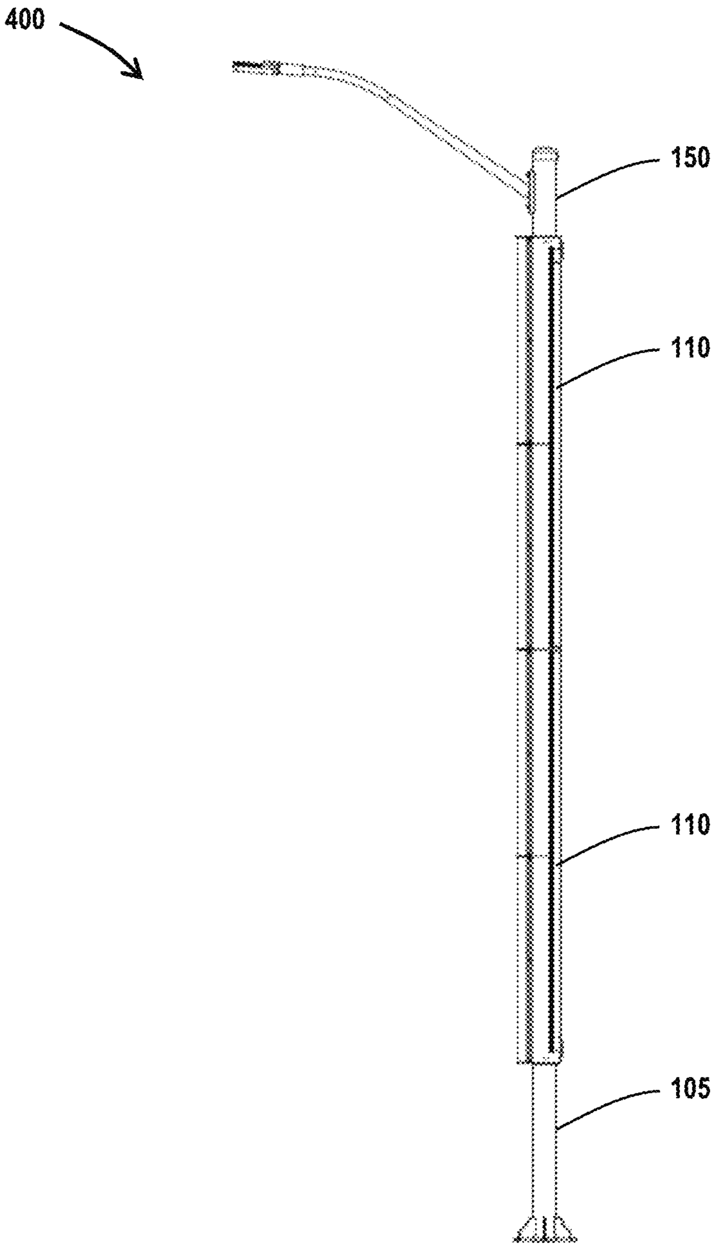
FIG. 4 is a side view of an example configuration based on the system of FIG. 1, according to an embodiment.

FIG. 4 depicts a side view of an example configuration 400 based on the system of FIG. 1, according to an embodiment of the present disclosure.

Figure 5:
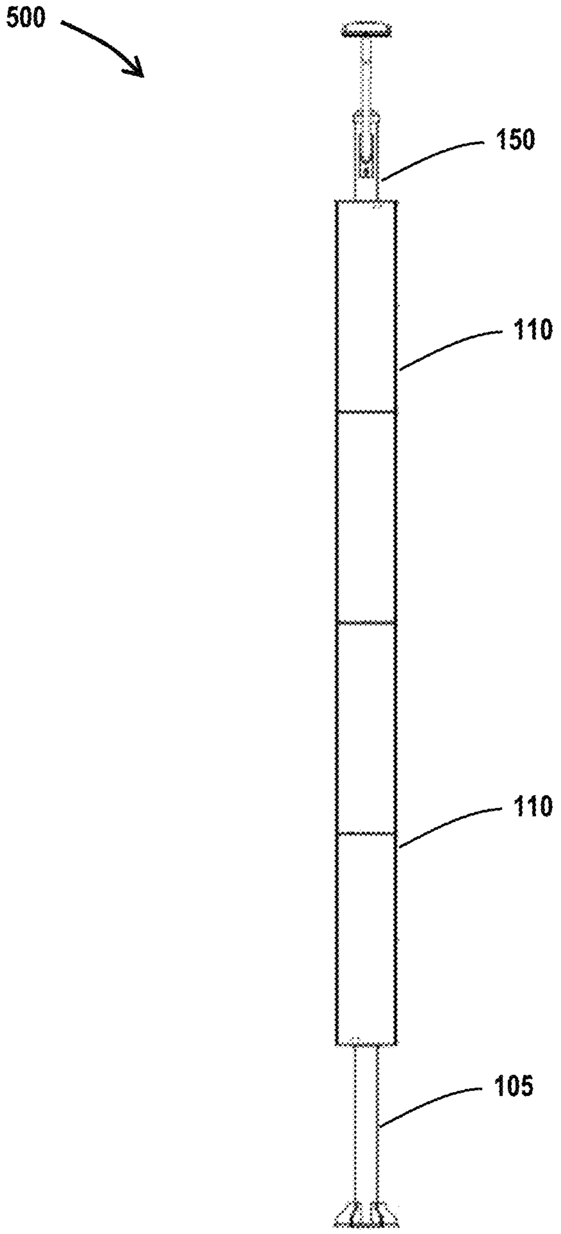
FIG. 5 is a rear view of an example configuration based on the system of FIG. 1, according to an embodiment.

FIG. 5 depicts a rear view of an example configuration 500 based on the system of FIG. 1, according to an embodiment of the present disclosure.

Figure 6:
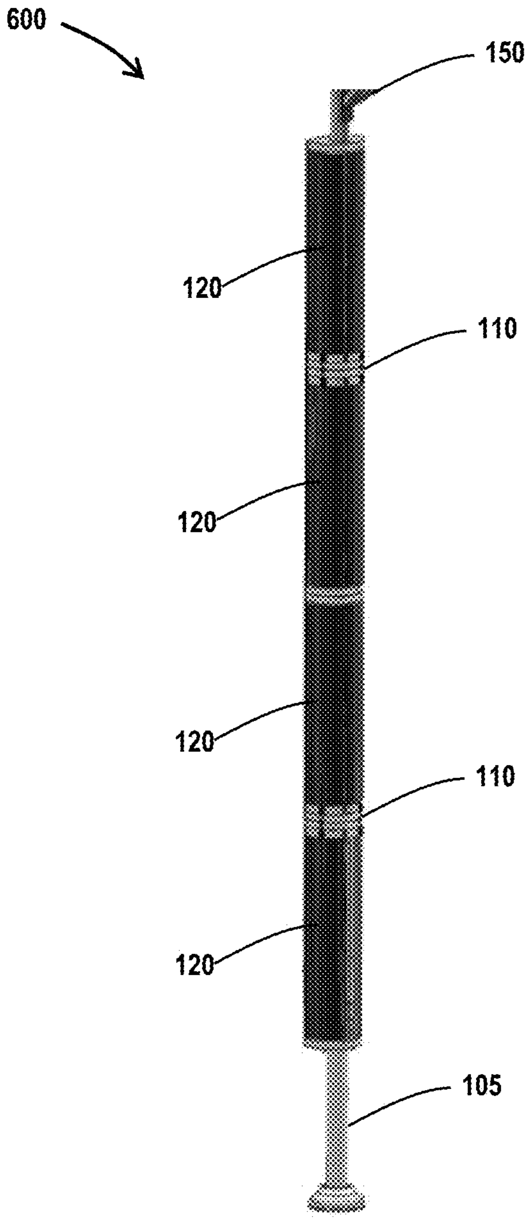
FIG. 6 is another perspective front view of an example configuration based on the system of FIG. 1, according to an embodiment.

FIG. 6 depicts another perspective front view of an example configuration 600 based on the system of FIG. 1, according to an embodiment of the present disclosure.

The perspective view configuration 600 optionally depicts the solar panels 120 affixed to module 110 as a 90 degrees wrap around the curved radially segmented surface 115, but other configurations may also be contemplated. As depicted, a plurality of the solar panels 120 may be affixed to each module 110.

In another embodiment of the present disclosure, there is shown and described a solar module assembly having a solar array that can be pointed in the optimal direction to capture the sun's rays with the highest efficiency.

In this regard, the solar module assembly is adapted to rotate (or pivot) along its z-axis, and once in position, a top-mounted equipment may independently be configured and pointed in a different direction. The top-mounted equipment is a variable element of the design and can include, without limitation, for example, security cameras, lighting, Wi-Fi™ towers, etc. —in theory, anything that can be powered by the pre-installed battery and battery management devices. An example of a common device that could be mounted to the power source structure would be LED parking lot lighting.

Figure 7:
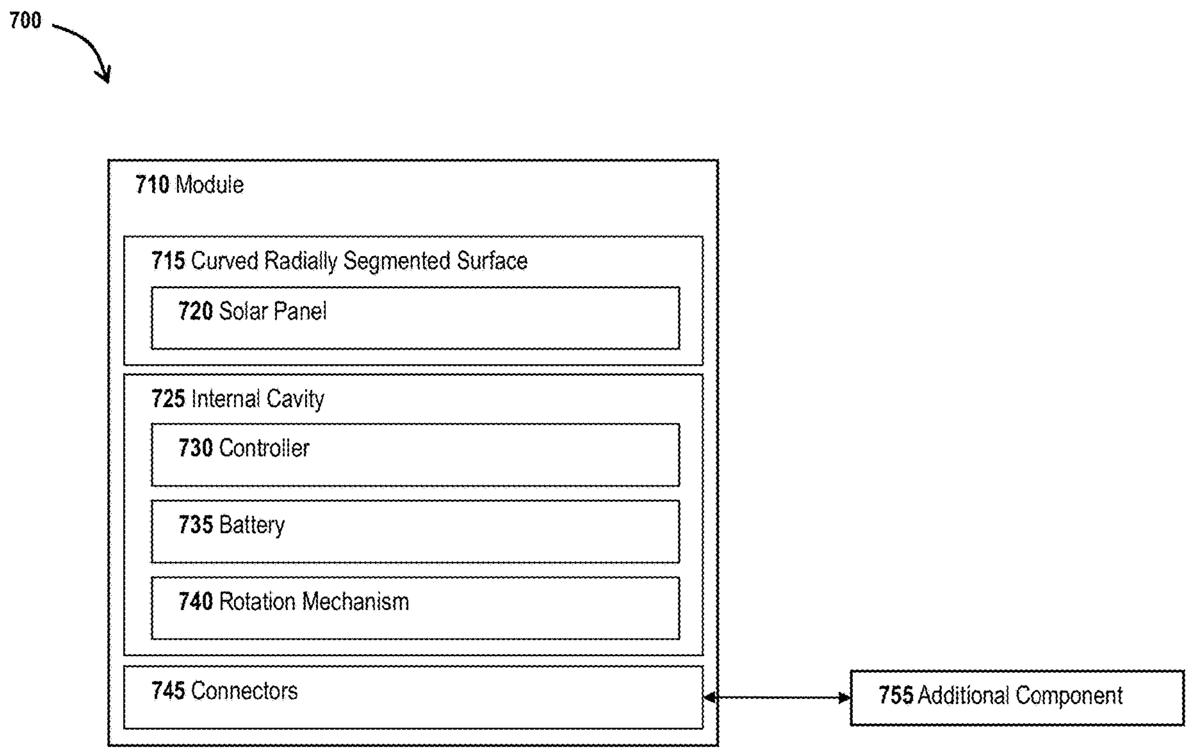
FIG. 7 is a block diagram of an example apparatus for solar power harvesting, according to an embodiment.

FIG. 7 depicts a block diagram of an example apparatus 700 for solar power harvesting, according to an embodiment of the present disclosure.

The apparatus 700 includes a module 710 having a curved radially segmented surface 715 for attachment of a solar panel 720 thereon. The apparatus 700 further includes an internal cavity 725 within the module 710.

The curvature of the solar panel 720 mounting surface (curved radially segmented surface 715) allows the sun's energy to be captured as it rises and sets from dawn to dusk. The design element allows an East to South to West energy capture depending on how the solar panel 720 array is installed on the curved radially segmented surface 715 of the modular assembly.

Solar panels 720 may be mounted to the module 710 in such a way that each solar panel 720 covers a sector of potential illumination to be configured in part or as a whole element that is to be uniquely controlled in terminal voltage and current.

In some embodiments, solar panels 720 may be of a flexible type. In other embodiments, the solar panels 720 may be of a rigid type.

In some embodiments, solar panels 720 may be wired in different configurations such as series and/or parallel to optimize the capture of the sun's rays for the power requirements.

This universal modular body construction advantageously allows the module 710 to have solar panels arranged radially in segmented columns. Each individual column may then be controlled independently to generate maximum power as the sun transverses its natural arc from East to West.

Solar panel 720 elements may be mounted along the curved radially segmented surface 715 in sectors. Each vertical sector of solar panel 720 elements mounted to the curved radially segmented surface 715 may be electrically connected to form a plurality of modules ultimately creating a fixed light tracking configuration as sun tracks East to South to West.

Modules 710 may be scalable to provide a solar panel area for directional solar capture using one or a plurality of solar panel column segments.

A module 710 may be constructed from any suitable material, including without limitation, steel, aluminum, plastic/polymer, or other composite material.

Each solar panel 720 column element may be connected in series or in parallel with adjacent modules 710 to provide an appropriately matched photovoltaic (PV) voltage for the one or more of Maximum Power Point Tracking (MPPT) controllers connected to that or a plurality of solar panel 720 column elements.

In various embodiments, the configuration of the solar panels 720 may be such that a sector of a curved solar panel 720 mounting circuit may be grouped as a controllable element.

The number and type of solar panels 720 affixed to a module 710 may vary. For example, a vertical solar panel 720 may be adhered over the full length of two or four sections of a module 710, while a second, third, or fourth panel may be configured every 45 degrees around the curvature of the module 710. This type of configuration may also be known as an infinite array of solar panels.

The internal cavity 725 is configured to engage with a base post.

In various embodiments, a base post may be, for example, base post 105 of FIG. 1.

The internal cavity 725 is further configured to accommodate and secure a controller 730 and a battery 735. The controller 730 and the battery 735 are in electrical communication with each other and the solar panel 720. The controller 730 is configured to charge the battery 735 with electricity generated by the solar panel 720.

In some embodiments, the battery 735 and/or controller 730 may be within a compartment inside the internal cavity 725 having a hinged and keyed swinging door.

In various embodiments, the controller 730 may be a Maximum Power Point Tracking (MPPT) controller for stationary solar tracking in a module 710.

One or more MPPT controllers for each of the one or more solar panel column segments may be connected to one or more of the batteries 735 contained in one or more modules 710.

Moreover, a solar charge controller 730 may interface with either one or a plurality of solar panel 720 elements to provide independent and unique control of each element voltage and current. Thus, this may allow for the production of the highest power capable under that solar panel 720 element's illumination conditions while still being able to transfer energy to one or more batteries 735 (or battery management devices) regardless of fluctuations or mismatch in the battery terminal voltage.

In various embodiments, the solar charge controller 730 may be configured to operate independently, or via remote control, or through some combination thereof via integrated communications technology.

The battery 735 inside the module 710 may consist of any suitable chemistry and composition battery (either electrochemical or electromechanical) such as Absorbent Glass Mat (AGM) or Lithium Ferro Phosphate technology (LFP or LiFePO4) but is not limited to any specific technology and may accommodate other types of batteries as well.

Those of skill in the art will appreciate that battery management systems may also vary depending on a battery type.

In various embodiments, a battery management system may be either an integral part of the solar charge controller 730, or within the battery 735, or as a separate device within the module 710.

The internal cavity 725 is further configured to accommodate a rotation mechanism 740 configured to rotate the module 710 to track sunlight. The module 710 is independently rotatable about a base post.

In some embodiments, the rotation mechanism 740 includes a cavity to rotatably engage with at least a portion of a base post.

In various embodiments, the rotation mechanism 740 may include, without limitation, a motorized mechanism, or it may be non-motorized mechanism. For example, a pipe with a collar (e.g., a part of a base post) may be rotatably engaged with another pipe (e.g., rotation mechanism 740) to allow the module 710 to rotate.

The solar panels 720 are thus able to be pointed in the optimal direction to capture, at the highest efficiency, the sun's rays. Substantially vertical, the solar module 710 assembly may rotate/pivot about its z-axis to achieve this. Once configured, a top-mounted equipment may be independently configured and pointed in a different from the module 710 direction depending on the nature of the use.

In various embodiments, a top-mounted equipment may be, for example, top-mounted equipment 150 of FIG. 1.

In various embodiments, the internal cavity 725 within each module 710 has a configurable tray, shelf, and bracket design to support, without limitation, energy storage devices, control equipment and communication equipment.

Furthermore, each module 710 may have a removable or hinged backing on a non-solar panel side to provide access to an energy storage, communications, and control compartment.

The internal cavity 725 may be lined or filled with insulative material to prevent heat loss and ingress to or from the internally housed equipment.

The module 710 further includes connectors 745 to facilitate mechanical, electrical and thermal interconnection between the module 710 and an additional component 755.

In various embodiments, the connectors 745 are further configured to facilitate mechanical, electrical, and/or thermal interconnection between the module 710, a base post, and a top-mounted equipment.

A top-mounted equipment may be configured to be coupled to the module 710 and in electrical communication with the module 710. The top-mounted equipment may be independently rotatable about the module 710.

A module 710 may thus be configured to provide a rotational z-axis relative to an adjacent module 710 or a top-mounted equipment.

In some embodiments, the additional component 755 includes a second module.

In various embodiments, a plurality of modules 710 may be attached to each other without the use of a separate interconnecting member.

As contemplated by the present disclosure, a module 710 may be electrically and thermally connected to another module to allow for interconnectivity between modules.

In some embodiments, the controller 730 of the module 710 is configured to be in electrical communication with a solar panel of the second module.

In some embodiments, the module 710 is configured to electrically connect to the additional component 755 in series. In some embodiments, the module 710 is configured to electrically connect to the additional component 755 in parallel.

In some embodiments, the module 710 further includes a thermal management system for regulating temperature within the module 710.

Thermal management within a module 710 may be achieved in a number of ways, including using insulation (e.g., spray foam) and techniques of heating the batteries in each module 710. As functionality and charging capabilities of certain battery types may be limited by cold temperatures, internal heater-equipped batteries or heaters within the module 710 may be utilized. In various embodiments, particularly those on a larger-scale, a mini-heat pump may also be used within a module.

Similarly, these concepts may be extended to cooling, such that a module 710 may employ various techniques for cooling, including fans or liquid coolants.

In various embodiments, one or more batteries 735 in the module 710 may be heated or cooled independently of the charge/discharge status of the battery 735 using energy supplied by the solar panels 720, or an interconnected base post, or a top-mounted equipment.

The heating algorithm for each battery 735 may be adjustable based on factors including, but not limited to, the measured module 710 temperature, the internal temperature of the battery 735, the time of day, the available energy via the solar panels 720, or an interconnected base post, or a top-mounted equipment, and state of charge of the battery 735.

The heating algorithm for each battery 735 may use energy sourced from its own internally stored energy, externally from its solar panels 720, or co-housed one or more batteries 735, or externally from one or more adjacent connected modules 710 solar panels 720 or co-housed one or more batteries 735, or externally from energy supplied via an interconnected base post, or a top-mounted equipment.

In some embodiments, the solar panel 720 includes a set of photovoltaic (PV) cells. Such cells can be made using different technologies such as Monocrystalline silicon, Polycrystalline silicon, Thin-film, Concentrated PV (CPV), Organic Photovoltaic (OPV), Perovskite, or Dye Sensitized Solar Cells (DSSC).

Each PV cell may thus be easily replaceable if damaged or malfunctioning.

In some embodiments, each PV cell of the set of PV cells is controlled separately by the controller 730.

A controller 730 may be configured to control each PV cell of a plurality of PV cells independently of the others, in order to maximize efficiency.

In various embodiments, solar elements (i.e., PV cells) of a module 710 may be connected in series and/or in parallel, as well as to solar elements of another module 710.

In some embodiments, the module 710 is configured to electrically connect to a power grid via a base post. In some embodiments, the module 710 is configured to electrically connect to a power grid via a top-mounted equipment.

In some embodiments, the module 710 is configured to operate electrically and/or thermally independently of a base post, the additional component 755, and a top-mounted equipment.

Thus, each module 710 may source and/or store energy independently of the energy available from adjacent connected modules 710, a base post, or an interconnected top-mounted equipment.

In some embodiments, module 710 is configured to obtain electrical or thermal energy available to a base post, the additional component 755, or a top-mounted equipment.

Each module 710 may source energy available to adjacent connected modules 710, a base post, or an interconnected top-mounted equipment.

Thus, each module 710 may be able to operate both independently as its own energy source for heating and peripheral supply, and dependently on adjacent modules 710, a base post, or an interconnected top-mounted equipment to receive energy for heating and peripheral supply.

In various embodiments, a first module 710 may be able to source energy from a second module 710, and provide that energy to a third module 710. Similarly, a module 710 may be able to source energy from, for example, a base post that is connected to a power grid, or an interconnected top-mounted equipment that is a wind turbine.

Modules 710 may be pre-assembled at a manufacturing facility in a fashion that when shipped on site can take minimal assembly prior to being hoisted onto a base post. When hoisted onto the base post, a module 710 may be configured/pointed to the optimal direction to best capture the sun's rays based on the solar array configuration and instructions provided by the manufacturer.

Figures 8A, 8B, 8C:
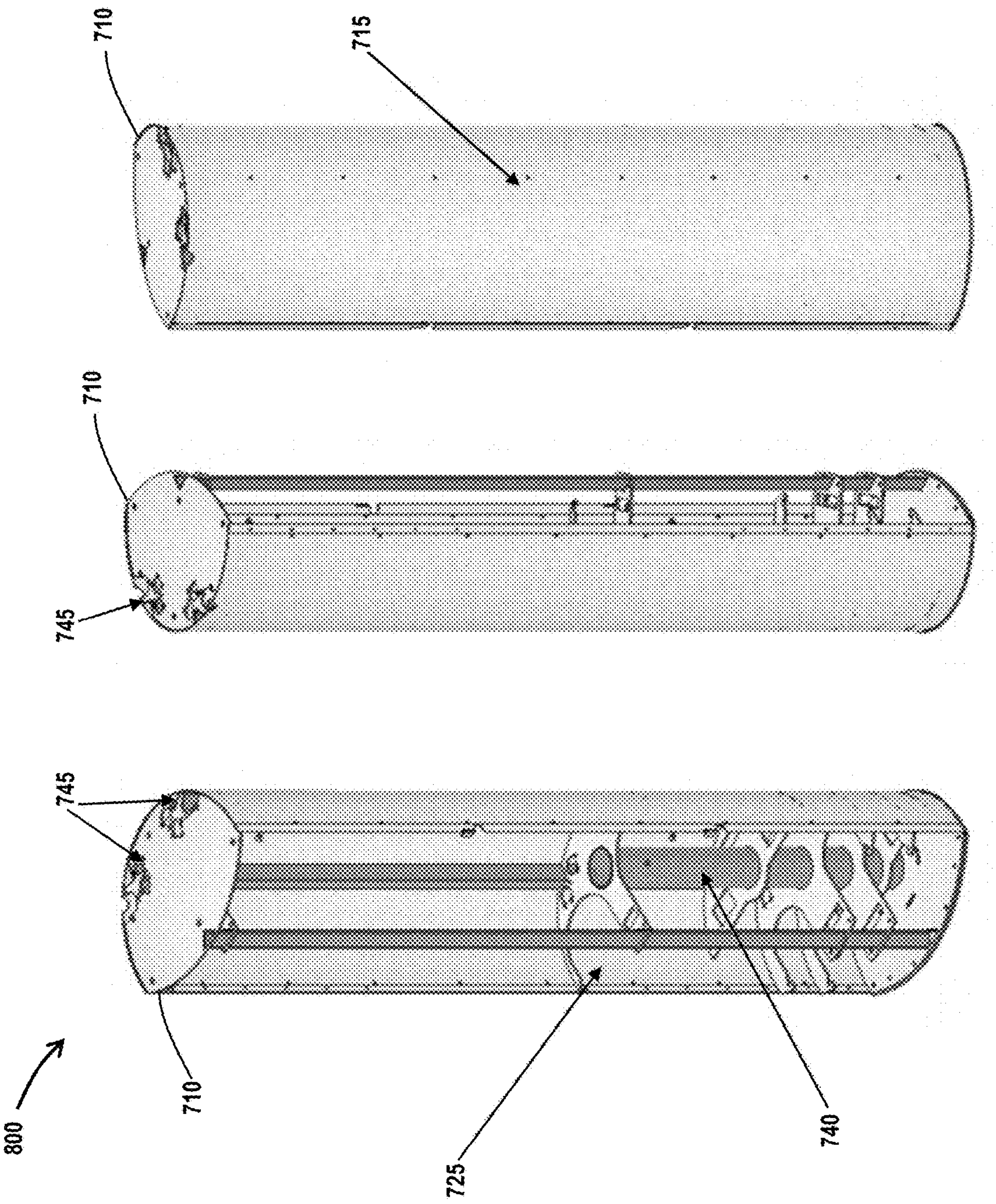
FIGS. 8A, 8B and 8C are rear, side and front views of an example configuration based on the apparatus of FIG. 7, according to an embodiment.

FIGS. 8A, 8B and 8C depict rear, side and front views, respectively, of an example configuration 800 based on the apparatus of FIG. 7, according to an embodiment of the present disclosure.

The configuration 800 depicts a module 710 having a curved radially segmented surface 715 for attachment of a solar panel thereon.

The configuration 800 further depicts an internal cavity 725 within the module 710.

The configuration 800 further depicts a rotation mechanism 740 configured to rotate the module 710 to track sunlight.

The configuration 800 further depicts connectors 745 to facilitate mechanical, electrical and thermal interconnection between the module 710 and an additional component.

Figure 9:
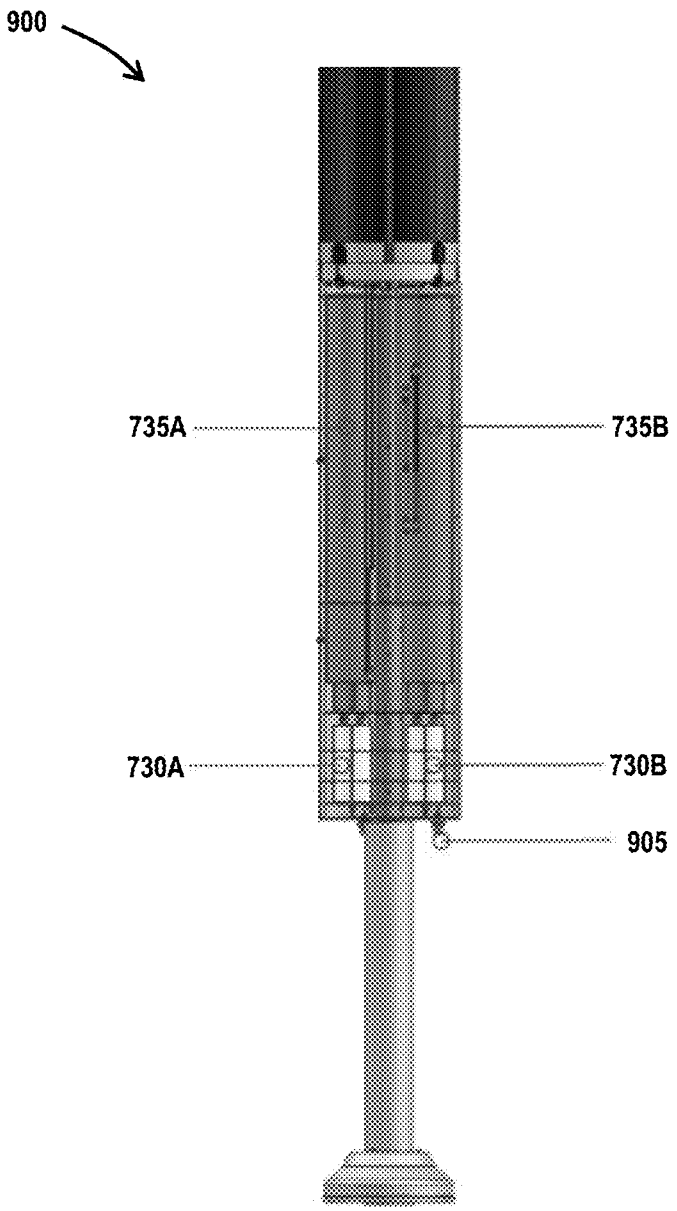
FIG. 9 is a front view of an example battery compartment configuration, according to an embodiment.

FIG. 9 depicts a front view of an example battery compartment configuration 900 based on the apparatus of FIG. 7, according to an embodiment of the present disclosure.

The configuration 900 depicts two battery packs 735A and 735B, along with two battery management and charge controllers 730A and 730B. The number of controllers/batteries can be greater or less than what is depicted and may be wired in any suitable electrical configuration.

Additionally, the configuration 900 depicts an antenna 905 for cloud interface.

Figure 10:
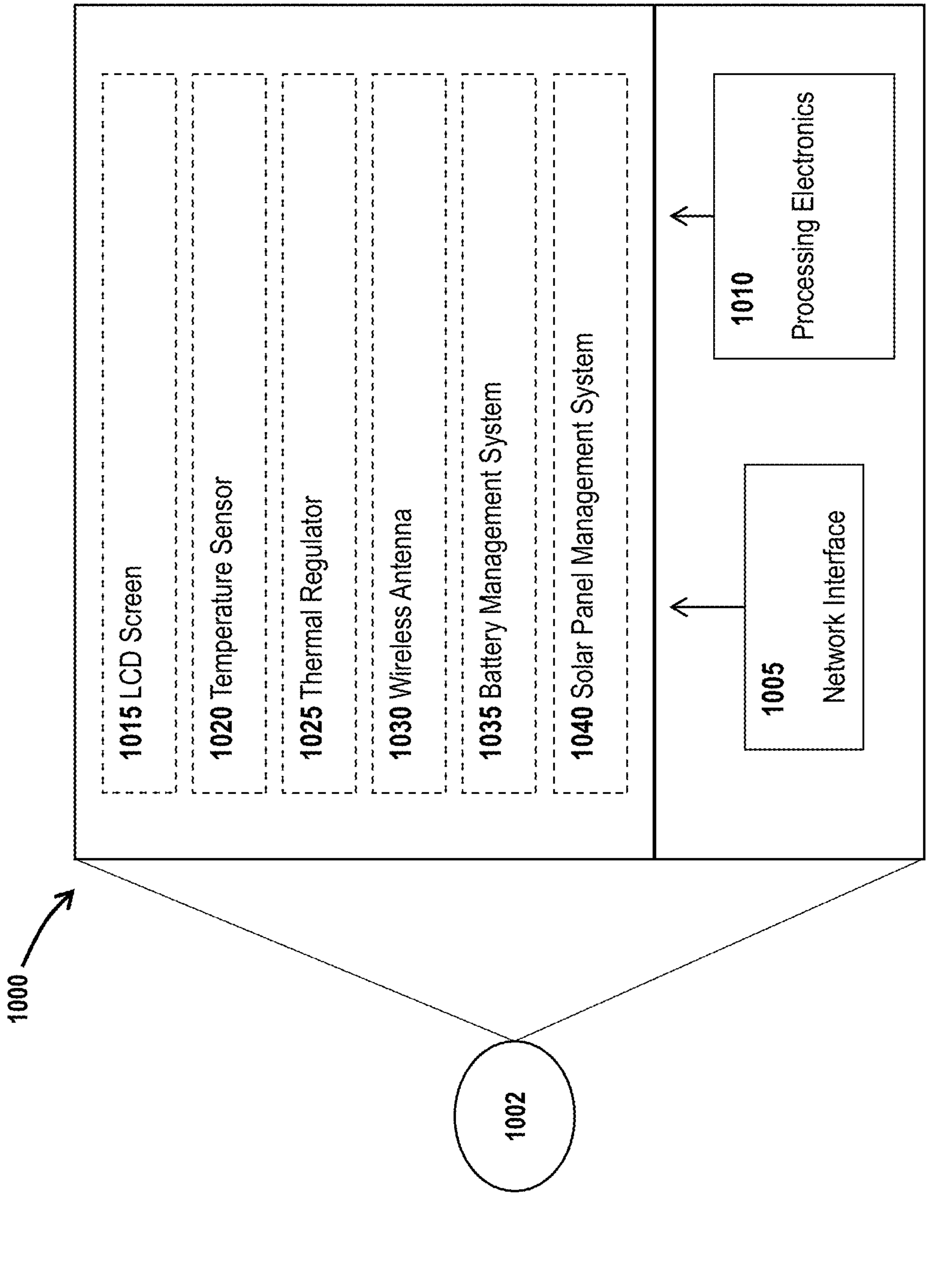
FIG. 10 is a block diagram of an example controller located within apparatus of FIG. 7, according to an embodiment.

FIG. 10 depicts an example controller 1000 located within a module 1002, according to an embodiment of the present disclosure.

In various embodiments, the module 1002 may be, for example, the apparatus 700 of FIG. 7.

The controller 1000 may be used to implement controllers (or solar controllers) disclosed herein such as, for example, the controller 130 of FIG. 1, and the controller 730 of FIG. 7.

The controller 1000 includes a network interface 1005 and processing electronics 1010.

The processing electronics 1010 can include a computer processer executing program instructions stored in memory, or other electronics components such as digital circuitry, including for example FPGAs and ASICs.

The network interface 1005 can include an optical communication interface or radio communication interface, such as a transmitter and receiver.

In various embodiments, the controller 1000 may further include, without limitation, an LCD screen 1015, a temperature sensor 1020 for monitoring battery or other temperatures, a thermal regulator 1025 for regulating temperature within the module 1002, a wireless antenna 1030 for network communication, a battery management system 1035, and a solar panel management system 1040.

Thermal regulator 1025 may be envisioned as being a part of the solar charge controller 1000, or it may be a separate device, used to manage temperatures within the module 1002 structure, and optionally secured with a cover plate. As functionality and charging capabilities of certain battery types may limited by cold temperatures, thermal regulator 1025 may be utilized to maintain suitable temperatures for batteries in conjunction with heating and/or cooling techniques.

Similarly, battery management system 1035 may be an integral or integrated part of the solar charge controller 1000, or it may be installed within the batteries, or it may be a separate device, used to transfer energy into the battery terminals, installed within the module 1002 structure, secured with a cover plate. The batteries and battery management systems/devices may vary for different battery types.

The controller 1000 may include several other functional components, each of which is partially or fully implemented using the underlying network interface 1005 and processing electronics 1010.

In some embodiments, the controller 1000 may be a Maximum Power Point Tracking (MPPT) controller.

Figure 11:
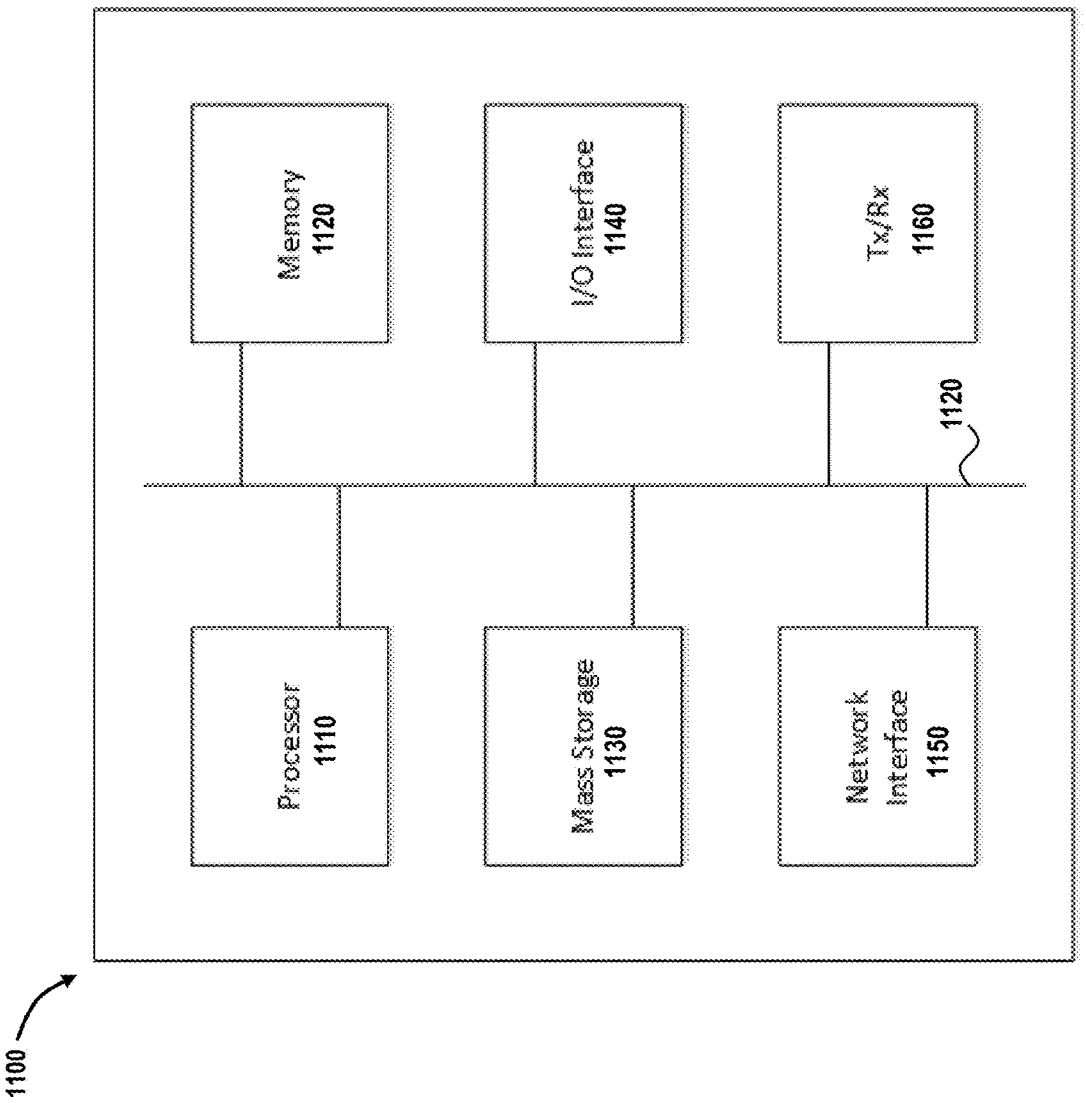
FIG. 11 is a block diagram of an example electronic device, according to an embodiment.

FIG. 11 depicts a block diagram of an example electronic device 1100 that may perform any or all of operations of the above methods and features explicitly or implicitly described herein, according to an embodiment of the present disclosure.

For example, a computer equipped with network function may be configured as electronic device 1100. The electronic device 1100 may be used to implement the controller 1000 of FIG. 10, for example.

As shown, the device includes a processor 1110, such as a Central Processing Unit (CPU) or specialized processors such as a Graphics Processing Unit (GPU) or other such processor unit, memory 1120, non-transitory mass storage 1130, I/O interface 1140, network interface 1150, and a transceiver 1160, all of which are communicatively coupled via bi-directional bus 1170.

According to certain embodiments, any or all of the depicted elements may be utilized, or only a subset of the elements. Further, the device 1100 may contain multiple instances of certain elements, such as multiple processors, memories, or transceivers. Also, elements of the hardware device may be directly coupled to other elements without the bi-directional bus.

Additionally, or alternatively to a processor and memory, other electronics, such as integrated circuits, may be employed for performing the required logical operations.

The memory 1120 may include any type of non-transitory memory such as static random-access memory (SRAM), dynamic random-access memory (DRAM), synchronous DRAM (SDRAM), read-only memory (ROM), any combination of such, or the like.

The mass storage element 1130 may include any type of non-transitory storage device, such as a solid-state drive, hard disk drive, a magnetic disk drive, an optical disk drive, USB drive, or any computer program product configured to store data and machine executable program code.

According to certain embodiments, the memory 1120 or mass storage 1130 may have recorded thereon statements and instructions executable by the processor 1110 for performing any of the aforementioned method operations described above.

FIGS. 12A, 12B and 12C depict front, exploded and top views of an example configuration 1200 of a base post 1205, according to an embodiment of the present disclosure. The example configuration 1200 of base post 1205 may be used to implement base posts disclosed herein such as, for example, the base post 105 of FIG. 1, however other configurations may also be contemplated.

The base post 1205 may be a vertically configured, length variable, base structure that is designed and manufactured to be affixed to a concrete base or extended for direct bury. The base post 1205 may be designed in a manner to allow the later modular solar and battery structure to be installed to the base post 1205 with ease.

In some embodiments, a concrete base or other suitable rigid structure may be installed into the ground to act as the base for the base post 1205, and later installed power source structure, consisting of design elements tailored to local municipality requirements and designed/approved by an Engineer. Often this structure will include concrete, grounding materials (PVC or ABS Pipe/grounding rod/grounding plate), fiberglass or rebar reinforcements, and mounting elements, including but not limited to J-Bolts.

While the above description provides examples of one or more apparatus, methods, or systems, it will be appreciated that other apparatus, methods, or systems may be within the scope of the claims as interpreted by one of skill in the art. Elements of each embodiment may be incorporated into other embodiments, for example, configurations discussed in relation to one embodiment, may be applied to other embodiments disclosed herein. Further, it is evident that various modifications and combinations can be made without departing from the invention. The specification and drawings are, accordingly, to be regarded simply as an illustration of the invention as defined by the claims, and are contemplated to cover any and all modifications, variations, combinations or equivalents that fall within the scope of the present invention.

The invention claimed is:

1. A solar power system comprising:
- a base post configured to receive a module and a top-mounted equipment;
- the module including:
  - a curved radially segmented surface for attachment of a solar panel thereon;
  - an internal cavity within the module configured to:
    - engage with the base post, wherein the base post extends into the module to a depth less than a height of the module;
    - accommodate and secure a controller and a battery, the controller and the battery in electrical communication with each other and the solar panel, wherein the controller is configured to charge the battery with electricity generated by the solar panel;
    - accommodate a rotation mechanism configured to rotate the module to track sunlight, wherein the module is independently rotatable about the base post;
  - connectors configured to facilitate mechanical, electrical, and thermal interconnection between the module and an additional component;
- the top-mounted equipment configured to be coupled to the module and in electrical communication with the module, wherein the top-mounted equipment is independently rotatable about the module.

2. The system of claim 1, wherein the additional component includes a second module.

3. The system of claim 2, wherein the controller of the module is configured to be in electrical communication with a solar panel of the second module.

4. The system of claim 1, wherein the module is configured to electrically connect to the additional component in at least one of: series, and parallel.

5. The system of claim 1, wherein the module further includes a thermal management system for regulating temperature within the module.

6. The system of claim 1, wherein the solar panel includes a set of photovoltaic (PV) cells.

7. The system of claim 6, wherein each PV cell of the set of PV cells is controlled separately by the controller.

8. The system of claim 1, wherein the module is configured to electrically connect to a power grid via at least one of: the base post, and the top-mounted equipment.

9. The system of claim 1, wherein the module is configured to operate electrically and thermally independently of the base post, the additional component, and the top-mounted equipment.

10. The system of claim 1, wherein the module is configured to obtain electrical or thermal energy available to the base post, the additional component, or the top-mounted equipment.

11. The system of claim 1, wherein the rotation mechanism includes a cavity to rotatably engage with at least a portion of the base post.

12. An apparatus for solar power harvesting, the apparatus comprising:
- a module having a curved radially segmented surface for attachment of a solar panel thereon;
- an internal cavity within the module configured to:
  - engage with a base post, wherein the base post extends into the module to a depth less than a height of the module;
  - accommodate and secure a controller and a battery, the controller and the battery in electrical communication with each other and the solar panel, wherein the controller is configured to charge the battery with electricity generated by the solar panel;
  - accommodate a rotation mechanism configured to rotate the module to track sunlight, wherein the module is independently rotatable about the base post;
- wherein the module further includes connectors to facilitate mechanical, electrical, and thermal interconnection between the module and an additional component.

13. The apparatus of claim 12, wherein the additional component includes a second module.

14. The apparatus of claim 13, wherein the controller of the module is configured to be in electrical communication with a solar panel of the second module.

15. The apparatus of claim 12, wherein the module is configured to electrically connect to the additional component in at least one of: series, and parallel.

16. The apparatus of claim 12, wherein the module further includes a thermal management system for regulating temperature within the module.

17. The apparatus of claim 12, wherein the solar panel includes a set of photovoltaic (PV) cells.

18. The apparatus of claim 17, wherein each PV cell of the set of PV cells is controlled separately by the controller.

19. The apparatus of claim 12, wherein the module is configured to electrically connect to a power grid via at least one of: the base post, and a top-mounted equipment.

20. The apparatus of claim 12, wherein the module is configured to operate electrically and thermally independently of the base post, the additional component, and a top-mounted equipment.

21. The apparatus of claim 12, wherein the module is configured to obtain electrical or thermal energy available to the base post, the additional component, or a top-mounted equipment.

22. The apparatus of claim 12, wherein the rotation mechanism includes a cavity to rotatably engage with at least a portion of the base post.

* * * * *